(12) United States Patent
Ma et al.

(10) Patent No.: US 9,174,858 B2
(45) Date of Patent: Nov. 3, 2015

(54) FLUID TREATMENT SYSTEM

(75) Inventors: Li Zheng Ma, London (CA); George Traubenberg, London (CA); Douglas Penhale, London (CA)

(73) Assignee: Trojan Technologies, London (CA)

( * ) Notice: Subject to any disclaimer, the term of this patent is extended or adjusted under 35 U.S.C. 154(b) by 805 days.

(21) Appl. No.: 12/514,894

(22) PCT Filed: Nov. 6, 2007

(86) PCT No.: PCT/CA2007/001989
§ 371 (c)(1),
(2), (4) Date: Apr. 8, 2010

(87) PCT Pub. No.: WO2008/055344
PCT Pub. Date: May 15, 2008

(65) Prior Publication Data
US 2010/0193421 A1    Aug. 5, 2010

Related U.S. Application Data

(60) Provisional application No. 60/856,833, filed on Nov. 6, 2006.

(51) Int. Cl.
C02F 1/32    (2006.01)

(52) U.S. Cl.
CPC ......... C02F 1/325 (2013.01); *C02F 2201/328* (2013.01); *C02F 2201/3225* (2013.01); *C02F 2201/3227* (2013.01)

(58) Field of Classification Search
CPC ...... C02F 1/32; C02F 1/325; C02F 2201/328; C02F 2201/322; C02F 2201/3225; C02F 9/00; B01J 19/123; A61L 2/10
USPC ........................................ 422/186.3
See application file for complete search history.

(56) References Cited

U.S. PATENT DOCUMENTS 4,751,392 A    6/1988    Wiesmann
5,503,800 A    4/1996    Free (Continued)

FOREIGN PATENT DOCUMENTS

| CN | 1130373 A | 9/1996 |
|---|---|---|
| CN | 1337922 A | 2/2002 |
| CN | 101568492 A | 10/2009 |

OTHER PUBLICATIONS

International Search Report for PCT/CA2007/001989.

(Continued)

*Primary Examiner* — Xiuyu Tai
(74) *Attorney, Agent, or Firm* — Katten Muchin Rosenman LLP

(57) ABSTRACT

In one of its aspects, the present invention relates to a fluid treatment system comprising: an inlet; an outlet; a fluid treatment zone disposed between the inlet and the outlet. The fluid treatment zone: (i) comprises a first wall surface and a second wall surface opposed to the first wall surface, and (ii) having disposed therein at least one array of rows of radiation source assemblies. Each radiation source assembly has a longitudinal axis transverse to a direction of fluid flow through the fluid treatment zone and each of the first wall surface and the second wall surface comprises a first fluid deflector element and a second fluid deflector element. The first fluid deflector element projecting into the fluid treatment zone to a greater extent than the second fluid deflector element.

52 Claims, 11 Drawing Sheets

(56) References Cited

U.S. PATENT DOCUMENTS

| | | | |
|---|---|---|---|
| 5,624,573 A * | 4/1997 | Wiesmann | 210/748.11 |
| 5,952,663 A | 9/1999 | Blatchley, III et al. | |
| 2002/0113021 A1 * | 8/2002 | Traubenberg et al. | 210/748 |
| 2005/0242013 A1 | 11/2005 | Hunter et al. | |

OTHER PUBLICATIONS

Australian Office Action, dated Sep. 23, 2011.
Canadian Office Action, dated May 6, 2011.
Canadian Office Action, dated Aug. 16, 2010.
Chinese Office Action, dated Dec. 10, 2011.
Extended EPO Search Report, dated Apr. 18, 2011.
Chiu K et al: "Effect of UV System Modification on Disinfection Performance", Journal of Environmental Engineering, New York, NY, US, vol. 125, No. 5, May 1, 1999, pp. 459-469.
Aug. 3, 2012 Office Action for Canadian Patent Application No. 2,732,208.
May 29, 2013 Office Action for Chinese Patent Application No. 201210097706.5.
Mar. 27, 2013 extended European Search Report for European Patent Application No. 12004213.

* cited by examiner

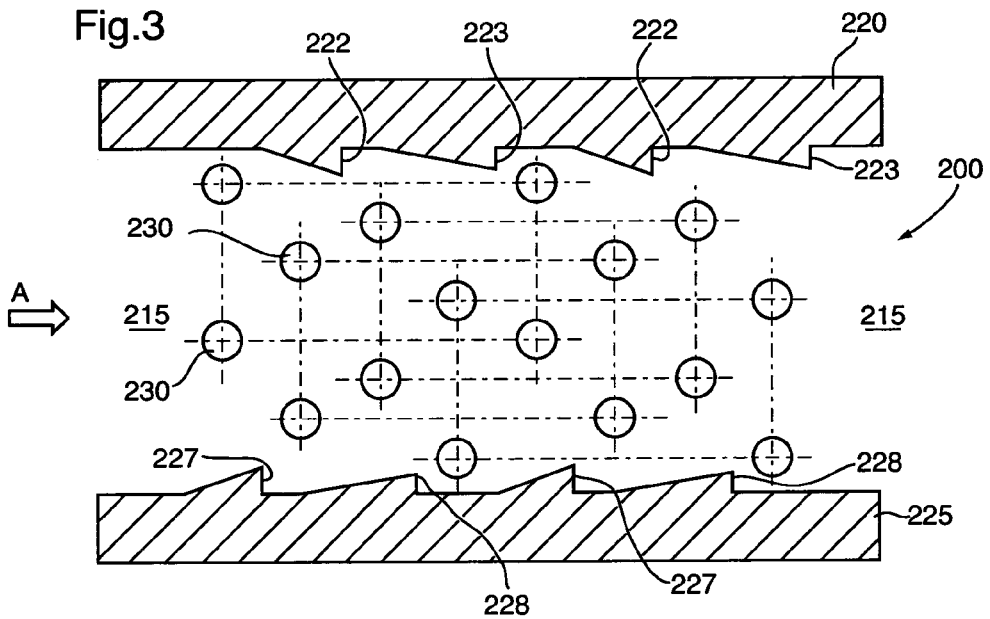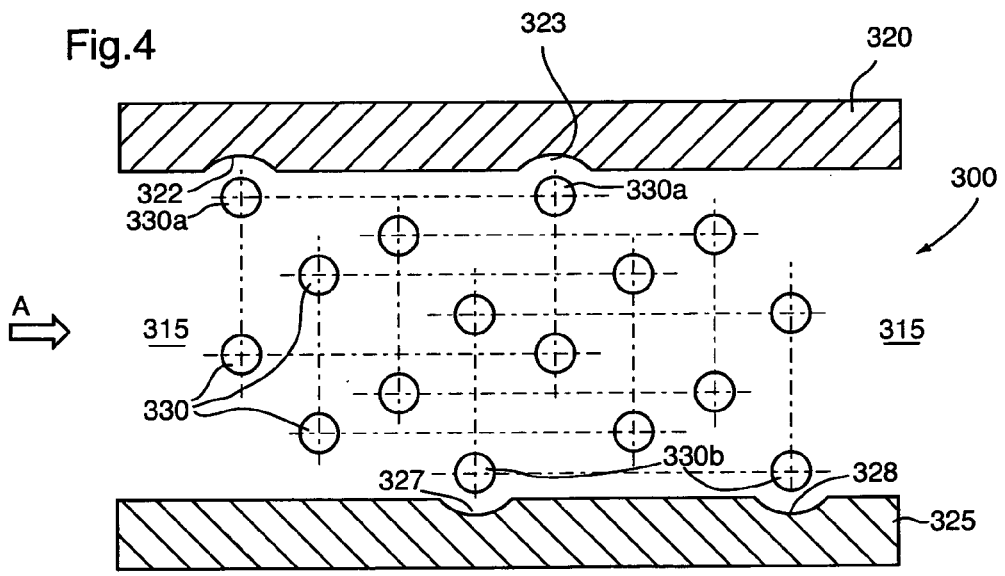

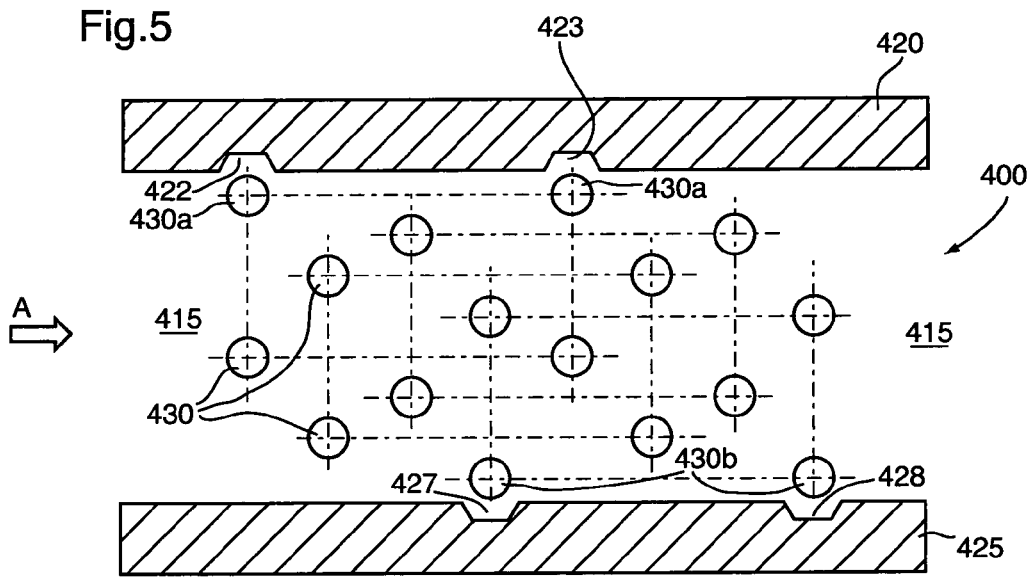
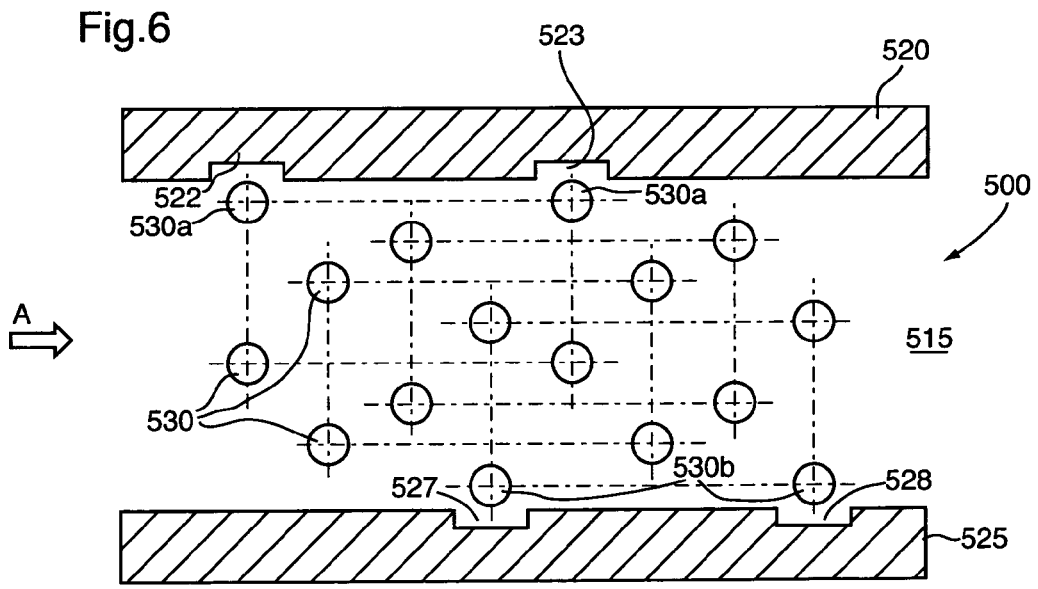

FLUID TREATMENT SYSTEM

FIELD OF THE INVENTION

In one of its aspects, the present invention relates to a fluid treatment system, more particularly, an ultraviolet radiation water treatment system. In another of its aspects, the present invention relates to a method for treating a fluid, more particularly a method for irradiating water.

DESCRIPTION OF THE PRIOR ART

Fluid treatment systems are generally known in the art. More particularly, ultraviolet (UV) radiation fluid treatment systems are generally known in the art. Early treatment systems comprised a fully enclosed chamber design containing one or more radiation (preferably UV) lamps. Certain problems existed with these earlier designs. These problems were manifested particularly when applied to large open flow treatment systems which are typical of larger scale municipal waste water or potable water treatment plants. Thus, these types of reactors had associated with them the following problems:
  relatively high capital cost of reactor;
  difficult accessibility to submerged reactor and/or wetted equipment (lamps, sleeve cleaners, etc);
  difficulties associated with removal of fouling materials from fluid treatment equipment;
  relatively low fluid disinfection efficiency, and/or
  full redundancy of equipment was required for maintenance of wetted components (sleeves, lamps and the like).
The shortcomings in conventional closed reactors led to the development of the so-called "open channel" reactors.

For example, U.S. Pat. Nos. 4,482,809, 4,872,980 and 5,006,244 (all in the name of Maarschalkerweerd and all assigned to the assignee of the present invention and hereinafter referred to as the Maarschalkerweerd #1 Patents) all describe gravity fed fluid treatment systems which employ ultraviolet (UV) radiation.

Such systems include an array of UV lamp modules (e.g., frames) which include several UV lamps each of which are mounted within sleeves which extend between and are supported by a pair of legs which are attached to a cross-piece. The so-supported sleeves (containing the UV lamps) are immersed into a fluid to be treated which is then irradiated as required. The amount of radiation to which the fluid is exposed is determined by the proximity of the fluid to the lamps, the output wattage of the lamps and the flow rate of the fluid past the lamps. Typically, one or more UV sensors may be employed to monitor the UV output of the lamps and the fluid level is typically controlled, to some extent, downstream of the treatment device by means of level gates or the like.

The Maarschalkerweerd #1 Patents teach fluid treatment systems which were characterized by improved ability to extract the equipment from a wetted or submerged state without the need for full equipment redundancy. These designs compartmentalized the lamp arrays into rows and/or columns and were characterized by having the top of the reactor open to provide free-surface flow of fluid in a "top open" channel.

The fluid treatment system taught in the Maarschalkerweerd #1 Patents is characterized by having a free-surface flow of fluid (typically the top fluid surface was not purposely controlled or constrained). Thus, the systems would typically follow the behaviour of open channel hydraulics. Since the design of the system inherently comprised a free-surface flow of fluid, there were constraints on the maximum flow each lamp or lamp array could handle before either one or other hydraulically adjoined arrays would be adversely affected by changes in water elevation. At higher flows or significant changes in the flow, the unrestrained or free-surface flow of fluid would be allowed to change the treatment volume and cross-sectional shape of the fluid flow, thereby rendering the reactor relatively ineffective. Provided that the power to each lamp in the array was relatively low, the subsequent fluid flow per lamp would be relatively low. The concept of a fully open channel fluid treatment system would suffice in these lower lamp power and subsequently lower hydraulically loaded treatment systems. The problem here was that, with less powerful lamps, a relatively large number of lamps was required to treat the same volume of fluid flow. Thus, the inherent cost of the system would be unduly large and/or not competitive with the additional features of automatic lamp sleeve cleaning and large fluid volume treatment systems.

This led to the so-called "semi-enclosed" fluid treatment systems.

U.S. Pat. Nos. 5,418,370, 5,539,210 and Re36,896 (all in the name of Maarschalkerweerd and all assigned to the assignee of the present invention and hereinafter referred to as the Maarschalkerweerd #2 Patents) all describe an improved radiation source module for use in gravity fed fluid treatment systems which employ UV radiation. Generally, the improved radiation source module comprises a radiation source assembly (typically comprising a radiation source and a protective (e.g., quartz) sleeve) sealingly cantilevered from a support member. The support member may further comprise appropriate means to secure the radiation source module in the gravity fed fluid treatment system.

Thus, in order to address the problem of having a large number of lamps and the incremental high cost of cleaning associated with each lamp, higher output lamps were applied for UV fluid treatment. The result was that the number of lamps and subsequent length of each lamp was dramatically reduced. This led to commercial affordability of automatic lamp sleeve cleaning equipment, reduced space requirements for the treatment system and other benefits. In order to use the more powerful lamps (e.g. medium pressure UV lamps), the hydraulic loading per lamp during use of the system would be increased to an extent that the treatment volume/cross-sectional area of the fluid in the reactor would significantly change if the reactor surface was not confined on all surfaces, and hence such a system would be rendered relatively ineffective. Thus, the Maarschalkerweerd #2 Patents are characterized by having a closed surface confining the fluid being treated in the treatment area of the reactor. This closed treatment system had open ends which, in effect, were disposed in an open channel. The submerged or wetted equipment (UV lamps, cleaners and the like) could be extracted using pivoted hinges, sliders and various other devices allowing removal of equipment from the semi-enclosed reactor to the free surfaces.

The fluid treatment system described in the Maarschalkerweerd #2 Patents was typically characterized by relatively short length lamps which were cantilevered to a substantially vertical support arm (i.e., the lamps were supported at one end only). This allowed for pivoting or other extraction of the lamp from the semi-enclosed reactor. These significantly shorter and more powerful lamps inherently are characterized by being less efficient in converting electrical energy to UV energy. The cost associated with the equipment necessary to physically access and support these lamps was significant.

Historically, the fluid treatment modules and systems described in the Maarschalkerweerd #1 and #2 Patents have found widespread application in the field of municipal waste water treatment (i.e., treatment of water that is discharged to a river, pond, lake or other such receiving stream).

In the field of municipal drinking water, it is known to utilize so-called "closed" fluid treatment systems or "pressurized" fluid treatment systems.

Closed fluid treatment devices are known—see, for example, U.S. Pat. No. 5,504,335 (Maarschalkerweerd #3). Maarschalkerweerd #3 teaches a closed fluid treatment device comprising a housing for receiving a flow of fluid. The housing comprises a fluid inlet, a fluid outlet, a fluid treatment zone disposed between the fluid inlet and the fluid outlet, and at least one radiation source module disposed in the fluid treatment zone. The fluid inlet, the fluid outlet and the fluid treatment zone are in a collinear relationship with respect to one another. The at least one radiation source module comprises a radiation source sealably connected to a leg which is sealably mounted to the housing. The radiation source is disposed substantially parallel to the flow of fluid. The radiation source module is removable through an aperture provided in the housing intermediate to fluid inlet and the fluid outlet thereby obviating the need to physically remove the device for service of the radiation source.

U.S. Pat. No. 6,500,346 [Taghipour et al. (Taghipour)] also teaches a closed fluid treatment device, particularly useful for ultraviolet radiation treatment of fluids such as water. The device comprises a housing for receiving a flow of fluid. The housing has a fluid inlet, a fluid outlet, a fluid treatment zone disposed between the fluid inlet and the fluid outlet and at least one radiation source having a longitudinal axis disposed in the fluid treatment zone substantially transverse to a direction of the flow of fluid through the housing. The fluid inlet, the fluid outlet and the fluid treatment zone are arranged substantially collinearly with respect to one another. The fluid inlet has a first opening having: (i) a cross-sectional area less than a cross-sectional area of the fluid treatment zone, and (ii) a largest diameter substantially parallel to the longitudinal axis of the at least one radiation source assembly.

Practical implementation of known fluid treatment systems of the type described above have been such that the longitudinal axis of the radiation source is: (i) parallel to the direction of fluid flow through the fluid treatment system, or (ii) orthogonal to the direction of fluid flow through the fluid treatment system. Further, in arrangement (ii), it has been common to place the lamps in an array such that, from an upstream end to a downstream end of the fluid treatment system, a downstream radiation source is placed directly behind an upstream radiation source.

The use of arrangement (ii) in a UV radiation water treatment system has been based on the theory that radiation was effective up to a prescribed distance from the radiation source, depending on the transmittance of the water being treated. Thus, it has become commonplace to interspace the radiation sources in arrangement (ii) such that the longitudinal axes of adjacent radiation sources are spaced at a distance equal to approximately twice the prescribed distance mentioned in the previous sentence.

U.S. Pat. No. 5,503,800 [Free] teaches an ultraviolet sterilizing system for waste water adopting arrangement (ii) described above. In the system taught by Free, channels are formed around a single lamp assembly and projections are formed in the channels to induce turbulent plug flow such that when the apparatus is inserted into a flow of liquid to be treated, the channels act to confine and direct liquid about the housing and the projections act to establish a continuous, cyclical flow in the channels between housing and the channels walls. This system has disadvantages since it requires individual channels be provided between a wall structure and a single lamp assembly. Thus, when treating large volumes of water, it is necessary to utilize a plurality of radiation source assemblies. The arrangement taught by Free is quite complicated since each radiation source assembly would have to be configured to have a pair of opposed chambers as shown in Free and each chamber would have to have the projections required to establish the so-called plug flow of the liquid. This is not surprising since the aim of the Free system is to create a continuous, cyclical flow in the channels between housing and the channels walls.

U.S. Pat. No. 5,952,663 [Blatchley, III et al. (Blatchley)] teaches an apparatus for applying ultraviolet radiation dosage to fluids in an open channel. With particular reference to FIG. 12 in Blatchley, there is shown a fluid treatment channel containing a module having a series of vertically disposed lamps (14). Disposed on the sidewalls of the fluid channel are a series of fluid diverters (27). As shown, the arrangement of fluid diverters (27) is such that each fluid diverter (27) projects into the fluid treatment channel to the same extent. Such an arrangement is disadvantages since it results in relatively high fluid head loss and low treatment efficiency.

Thus, despite the advances made in the art described above, there is still room for improvement. Specifically, it is desirable to have a fluid treatment system utilizing arrangement (ii) described above which provides relatively low hydraulic head loss of the fluid being treated while providing relatively high treatment efficiency.

SUMMARY OF THE INVENTION

It is an object of the present invention to obviate or mitigate at least one of the above-mentioned disadvantages of the prior art.

It is another object of the present invention to provide a novel fluid treatment system that obviates or mitigates at least one of the above-mentioned disadvantages of the prior art.

Accordingly, in one of its aspects, the present invention provides a fluid treatment system comprising:
an inlet;
an outlet;
a fluid treatment zone disposed between the inlet and the outlet, the fluid treatment zone: (i) comprising a first wall surface and a second wall surface opposed to the first wall surface, and (ii) having disposed therein at least one array of rows of radiation source assemblies;
each radiation source assembly having a longitudinal axis transverse to a direction of fluid flow through the fluid treatment zone;
each of the first wall surface and the second wall surface comprising a first fluid deflector element and a second fluid deflector element, the first fluid deflector element projecting into the fluid treatment zone to a greater extent than the second fluid deflector element.

In another of its aspects, the present invention provides a fluid treatment system comprising:
an inlet;
an outlet;
a fluid treatment zone disposed between the inlet and the outlet, the fluid treatment zone comprising a first wall surface and a second wall surface opposed to the first wall surface;
a first radiation source assembly comprising a radiation source having a first longitudinal axis transverse to a direction of fluid flow through the fluid treatment zone;
a first fluid receptacle portion disposed in the first wall surface to define a first junction therebetween, the first fluid receptacle portion comprising a first apex portion configured such that a first ratio of (i) a first distance between a first centerpoint of the first radiation source and the first apex portion, to (ii) a second distance between the first centerpoint and the first junction is greater than or equal to 1.

In yet another of its aspects, the present invention provides a fluid treatment system comprising:

an inlet;

an outlet;

a fluid treatment zone disposed between the inlet and the outlet, the fluid treatment zone comprising a first wall surface and a second wall surface opposed to the first wall surface;

a first radiation source assembly comprising a radiation source having a first longitudinal axis transverse to a direction of fluid flow through the fluid treatment zone;

a first fluid receptacle portion disposed in the first wall surface between a first junction and a second junction, the first radiation source assembly being oriented such that: (i) a first centerpoint of the first radiation source is disposed between the first junction and the second junction along a normal to the direction of fluid flow, and (ii) it is in spaced relation toward a center region of the fluid treatment zone with respect to a line interconnecting the first junction and the second junction.

Thus, the present inventors have discovered an improved fluid treatment system. The improvement results from using an approach that is somewhat counterintuitive to the prior art approach. Specifically, the prior art approach of Blatchely was premised on using a flow diverter structure on the wall of the fluid treatment zone to direct fluid (typically water) being treated from the wall toward the center of the fluid treatment zone in which there is disposed a series of radiation source assemblies. Contrary to this approach, the present fluid treatment systems uses a combination of the radiation source assembly and a prescribed wall structure to encourage fluid flow along the sides of the walls of the fluid treatment zone while obviating or mitigating short circuiting (i.e., the phenomenon where fluid travel along the wall is not subject to a sufficient dose of radiation). Thus, unlike the prior art approach which seeks to concentrate fluid flow toward the middle of the fluid treatment zone, the present fluid treatment system relies on relatively uniform fluid flow from side to side in the fluid treatment zone while obviating or mitigating short circuiting.

In one generally preferred embodiment of the present fluid treatment system, at least two fluid flow deflectors are positioned in a reactor wall (preferably in each of opposed reactor walls) of the fluid treatment system. These fluid flow deflectors are configured to direct fluid to be treated toward radiation source assemblies positioned closest to the walls of the reactor system.

Preferably, each fluid flow deflector consists of two angled surfaces protruding into the fluid flow region in the reactor. The reactor wall (or walls) comprises at least a pair of these fluid flow deflectors and one of this pair protrudes further into the fluid treatment zone than the other. Preferably, as between a pair of these fluid deflector elements on a given reactor wall, the upstream fluid deflector element protrudes further into the fluid treatment zone than the downstream fluid deflector element.

While not wishing to be bound by any particular theory or mode of action with respect to this generally preferred embodiment, it is believed that the leading surface in the upstream fluid deflector element serves to force fluid flowing along the wall of the reactor to change direction toward the radiation source assembly nearest the reactor wall. The second surface of the same fluid flow deflector element generates relatively high momentum and strong flow vortex toward the radiation source assembly position closest to the wall of the reactor.

By directing the fluid flow in this manner, the amount of radiation energy absorbed by this part of the fluid flow is increased thereby improving the performance of the fluid treatment system or reactor. Additionally, this arrangement of fluid flow deflectors serves to minimize hydraulic head loss of the fluid being treated.

An additional advantage of using such fluid flow deflectors is that the number of radiation sources required in the fluid treatment system can be reduced thereby reducing overall capital costs of the system. The use of such fluid flow deflectors not only improves disinfection performance (since the flow of fluid is deflected from the wall of the fluid treatment zone to the radiation sources), but induces the advantageous creation of vortices which improves mixing of the fluid.

In a second generally preferred embodiment of the present fluid treatment system, so-called fluid flow relief wall structures or receptacle portions are employed (this will be described in more detail with respect to FIGS. 4-7).

While not wishing to be bound by any particular theory or mode of action with respect to this generally preferred embodiment, it is believed that fluid flowing along the reactor walls is impeded when the radiation source assembly is positioned close to the reactor wall. The purpose of such lamp assembly placement is to maintain an effective fluid thickness layer for effective treatment (e.g., disinfection). To position the radiation source assembly in this manner, a receptacle portion is disposed in the reactor wall.

This embodiment of the present fluid treatment system capitalizes on the inertia in the fluid since fluid naturally tends to travel along the sides of the wall of the fluid treatment zone in relatively straight lines—this is encouraged by the present fluid treatment zone and discouraged by the prior art approach. Thus, in this embodiment of the present fluid treatment zone, fluid is metered in a proportioned manner around the radiation source assembly near the receptacle portions.

The provision of such a receptacle portion in the reactor wall not only provides adequate clearance for radiation source peripheral elements such as cleaning systems and the like, but will also reduce loss of radiation by absorption of such radiation by the walls of the reactor. Additionally, the provision of such receptacle portions in the reactor wall serves to reduce hydraulic head loss of the fluid being treated as compared to a conventional deflector pattern as taught by Blatchley.

Further, the provision of such receptacle portions in the walls of the reactor allows for more cost effective manufacture of the reactor since the tolerance for peripherals such as the cleaning system can be more generous. Further, the clearance between the radiation source and the reactor wall can be optimized so there is less stress induced on the radiation source assembly due to vortex shedding that is typically generated from the radiation source assembly. The vortex is dampened on the side by the reactor wall. This is due to the fact that recessed portion alters the amount of fluid flowing between the radiation source assembly and that portion of the wall of the reactor. This serves to reduce stresses induced in the radiation source assembly by reducing the intensity and size of the vortices being shed. Consequently, this allows for greater hydraulic loading of the reactor which can then allow for the use of more powerful radiation sources in the radiation source assemblies, larger radiation source assemblies and/or positioning of more radiation source assemblies in hydraulic series.

BRIEF DESCRIPTION OF THE DRAWINGS

Embodiments of the present invention will be described with reference to the accompanying drawings, wherein like reference numerals denote like parts, and in which:

FIG. 3 is a top view of a fluid treatment system in accordance with a second preferred embodiment of the present invention;

FIG. 4 is a top view of a fluid treatment system in accordance with a third preferred embodiment of the present invention;

FIG. 5 is a top view of a fluid treatment system in accordance with a fourth preferred embodiment of the present invention;

FIG. 6 is a top view of a fluid treatment system in accordance with a fifth preferred embodiment of the present invention;

FIG. 4);

FIG. 1—similar to Blatchley);

DETAILED DESCRIPTION OF THE PREFERRED EMBODIMENTS

Prior to describing the preferred embodiments of the present invention, we will describe a prior art fluid treatment system such as the one taught in Blatchley described above.

Figure 1:
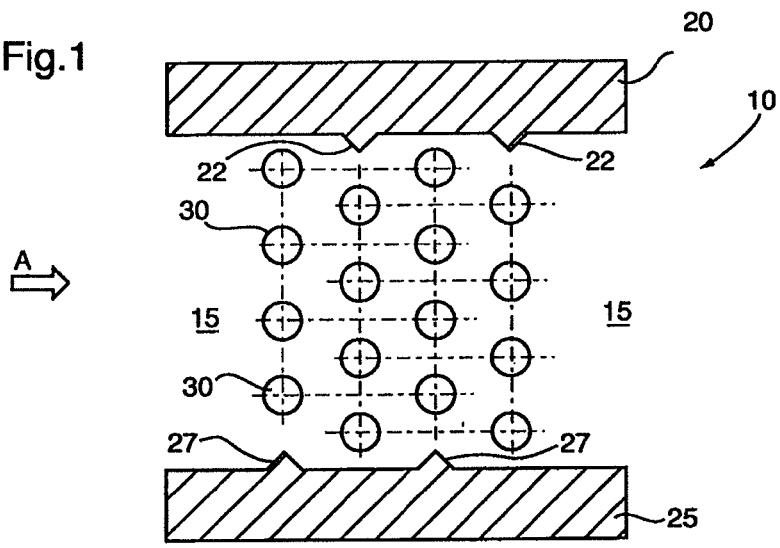
FIG. 1 is a top view of a prior art fluid treatment system similar to the one disclosed in Blatchley.

With reference to FIG. 1, there is illustrated a fluid treatment system 10 comprising a channel 15. Channel 15 comprises a pair of sidewalls 20,25. Open channel 15 is configured to receive a fluid flowing in the direction of arrow A.

Sidewall 20 comprises a pair of fluid diverters 22. Sidewall 25 comprises a pair of fluid diverters 27. Disposed in open channel 15 is a plurality of vertical oriented radiation source assemblies 30.

As can be seen from FIG. 1, fluid diverters 22,27 have the same profile (i.e., triangular) and project into channel 15 to the same degree.

Figure 2:
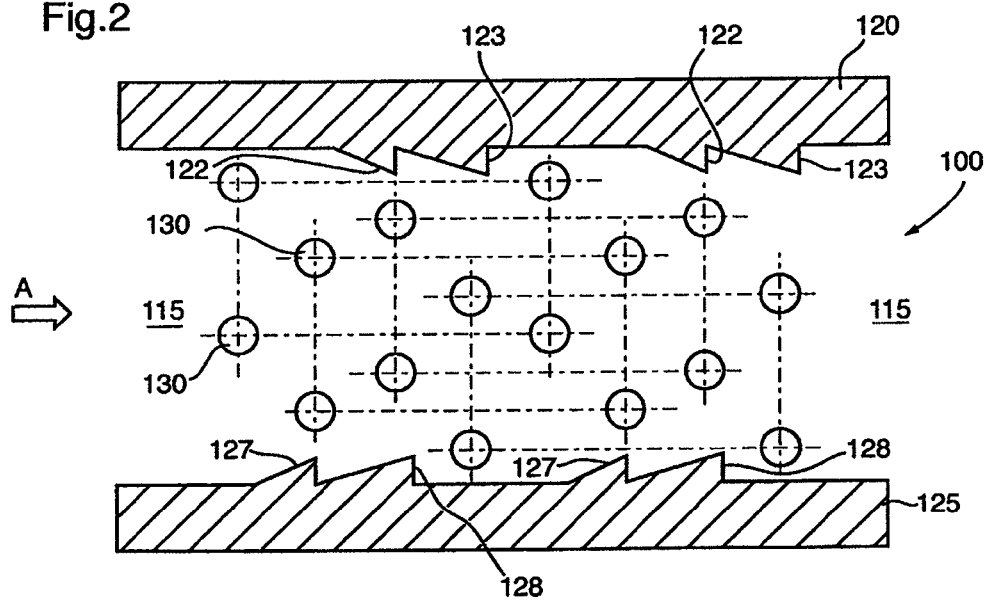
FIG. 2 is a top view of a fluid treatment system in accordance with a first preferred embodiment of the present invention.

With reference to FIG. 2, there is illustrated a first preferred embodiment of a fluid treatment system 100 in accordance with the present invention. Fluid treatment system 100 comprises an open channel 115 and a pair of opposed sidewalls 120,125. Open channel 115 is configured to receive a fluid flowing in the direction of arrow A.

Sidewall 120 comprises two pairs of fluid deflectors 122, 123. Sidewall 125 comprises two pairs of fluid deflectors 127,128. As can be seen, fluid deflectors 122,123,127,128 have the same cross-sectional shape—i.e., a right-angled triangle. As further evident, fluid deflectors 122,127 project into open channel 115 to a greater degree than fluid deflectors 123,128.

Disposed in open channel 115 is a plurality of radiation source assemblies 130.

In a particularly preferred embodiment of the present invention, radiation source assemblies 130 are arranged in a pattern similar in that described in co-pending U.S. patent application Ser. No. 11/078,706 filed Mar. 15, 2005 [From et al. (From)].

FIG. 3 illustrates a slightly modified version of fluid treatment system 100.

Thus, in FIG. 3, there is illustrated fluid treatment system 200. Fluid treatment system 200 comprises an open channel 215 and a pair of opposed sidewalls 220,225. Open channel 215 is configured to receive a fluid flowing in the direction of arrow A.

Sidewall 220 comprises two pairs of fluid deflectors 222, 223. Sidewall 225 comprises two pairs of fluid deflectors 227,228. As can be seen, fluid deflectors 222,223,227,228 have the same cross-sectional shape—i.e., a right-angled triangle. As further evident, fluid deflectors 222,227 project into open channel 215 to a greater degree than fluid deflectors 223,228.

Disposed in open channel 215 is a plurality of radiation source assemblies 230.

With reference to FIG. 4, there is illustrated a fluid treatment system 300. Fluid treatment system 300 comprises an open channel 315 and a pair of opposed side walls 320,325. Open channel 315 is configured to receive a fluid flowing in the direction of arrow A.

Sidewall 320 comprises a pair of receptacle portions 322, 323. Sidewall 325 comprise a pair of receptacle portions 327,328. As can be seen, receptacle portions 322,323,327, 328 have the same cross sectional shape—i.e., a portion of a circle.

Disposed in open channel 315 is a plurality of radiation source assemblies 330. As can be seen, the illustrated plurality of radiation source assemblies 330 comprises a pair of radiation source assemblies 330a that are closest to sidewall 320 and a pair of radiation source assemblies 330b that are closest to sidewall 325.

Figure 8:
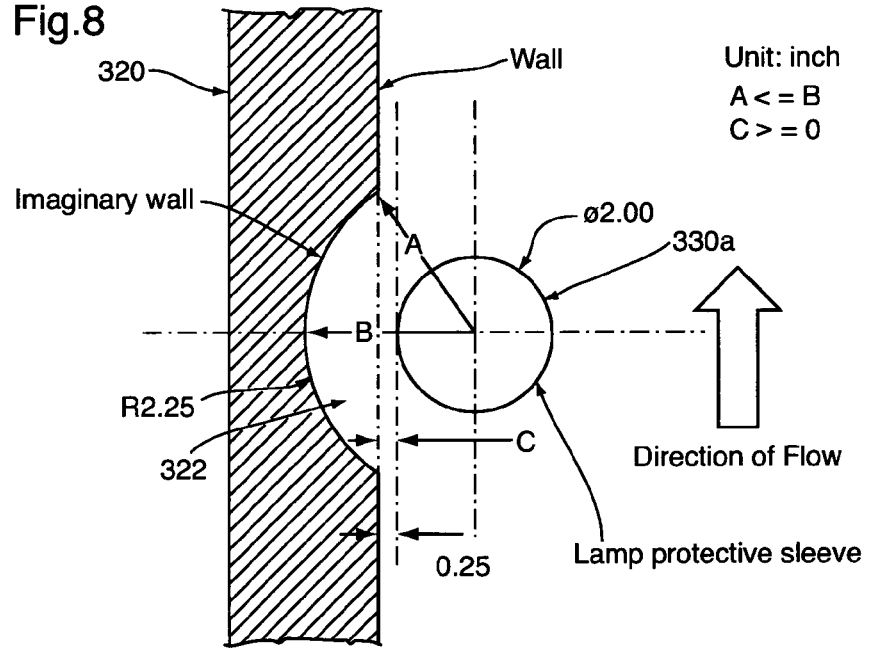
FIG. 8 is an enlarged portion of the fluid treatment system illustrated in FIG. 4.

As can be seen from FIGS. 4 and 8, the cross section of radiation source assemblies 330 and that of receptacle portions 322,323,327,328 are related—i.e., they are circular or comprise a portion of the circle. Further, it will be seen from each of radiation source assemblies 330a are disposed substantially concentrically with respect to receptacle portions 322,323. Similarly, each of radiation source assemblies 330b are disposed substantially concentrically with respect to receptacle portions 327,328.

With further reference to FIG. 8, it is apparent that the radiation source assembly is oriented such that: (i) a first centerpoint of the first radiation source is disposed between the "junctions" defined where the wall surface meets the receptacle along a normal to the direction of fluid flow, and (ii) it is in spaced relation toward a center region of the fluid treatment zone with respect to a line interconnecting the junctions in (i)—i.e., the radiation source assembly is on the side of the line closer to the fluid treatment zone than to the receptacle. It should be understood that the term "junction" is used in a broad sense and is not necessarily restricted to a specific point. For example, if there is a curved portion connecting the wall surface and the receptacle, the junction could be considered to be the point at which the path of the wall surface initially deviates toward the receptacle.

Figure 7:
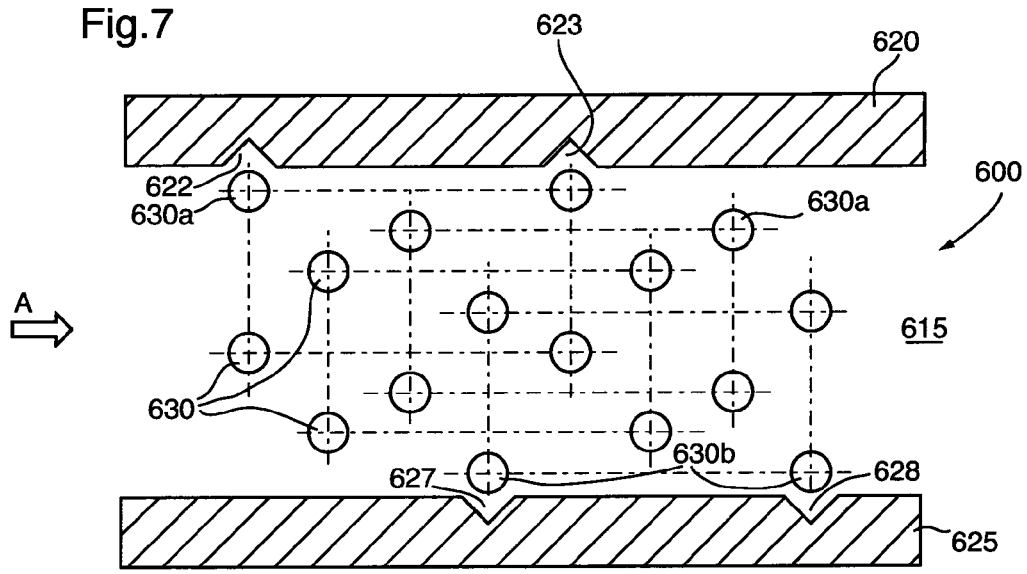
FIG. 7 is a top view of a fluid treatment system in accordance with a sixth preferred embodiment of the present invention.

FIGS. 5-7 illustrate fluid treatment systems similar to fluid treatment system 300 illustrated in FIG. 4. The principle difference in FIGS. 5-7 is that the various fluid treatment systems depicted therein have receptacle portions with varying cross-sectional shapes.

For ease of clarity, reference numerals in FIGS. 5-7 having the same last two digits as those in FIG. 4 are intended to depict like elements. Thus, open channel 315 in FIG. 4 corresponds with open channel 415 in FIG. 5, open channel 515 in FIG. 6 and open channel 615 in FIG. 7. This concordance applies with respect to the remaining elements depicted in FIGS. 5-7. An enlarged portion of the embodiments illustrated in FIGS. 5-7 is not provided as was provided for the embodiment illustrated in FIG. 4 (re. FIG. 8). Notwithstanding this, it should be understood that, in each of the embodiments illustrated in FIGS. 5-7, the radiation source assembly is oriented such that: (i) a first centerpoint of the first radiation source is disposed between the junctions defined where the wall surface meets the receptacle along a normal to the direction of fluid flow, and (ii) it is in spaced relation toward a center region of the fluid treatment zone with respect to a line interconnecting the junctions in (i)—i.e., the radiation source assembly is on the side of the line closer to the middle of the fluid treatment zone than to the receptacle. As is evident in FIGS. 5-7, the straight-line distance between the junctions is greater than a diameter of the adjacent radiation source. As is also evident in FIGS. 5-7, the direction of fluid flow A is substantially transverse to (i) the longitudinal axes of the radiation sources and (ii) the longitudinal axes of the receptacles.

Fluid treatment system 400 depicted in FIG. 5 comprises a series of recessed portions 422,423,427,428 having a cross-sectional shape in the form of a bilaterally symmetrical trapezoid.

Fluid treatment system 500 depicted in FIG. 6 comprises a series recessed portions 522,523,527,528 having a cross-sectional shape in the form of a rectangle.

Fluid treatment system 600 depicted in FIG. 7 comprises a series recessed portions 622,623,627,628 having a cross-sectional shape in the form of a triangle.

Figure 22:
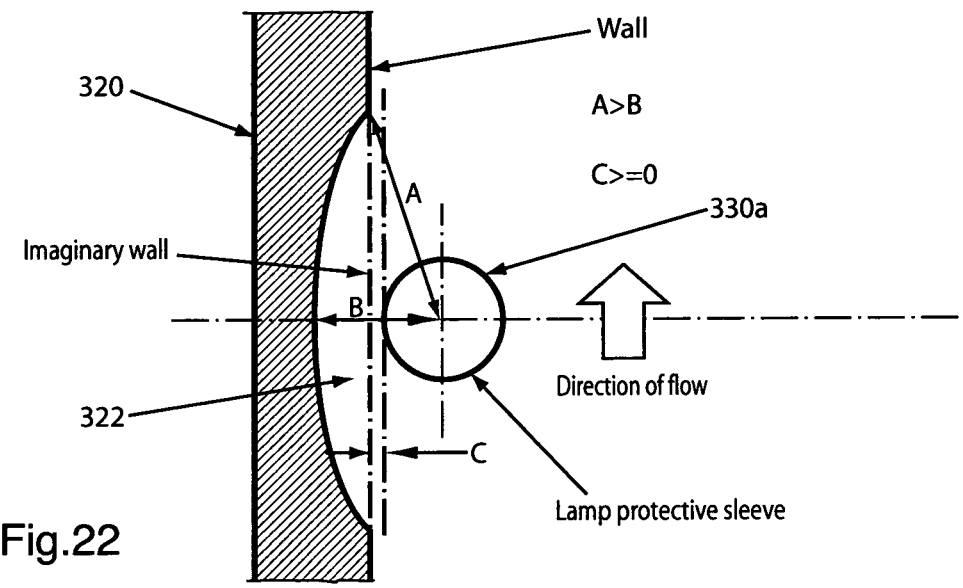
FIGS. 22-23 illustrate alternate embodiment to the embodiment shown in FIG. 8.
Figure 23:
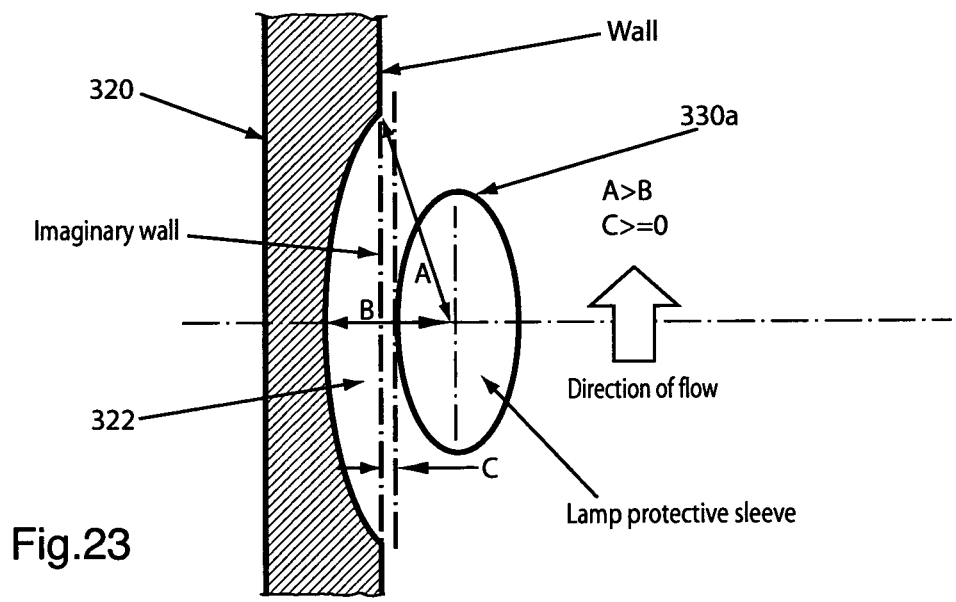

FIGS. 22-23 illustrate alternate preferred embodiments to the embodiment illustrated in FIG. 8.

Generally, it is preferred that the outer shape of the radiation source assembly (e.g., the protective sleeve, if present) and the shape of the receptacle be substantially the same (those of skill in the art will understand the shape of the receptacle will be a portion only). This feature provides enhanced disinfection while minimizing hydraulic head loss.

To compare the performance of preferred embodiments of the present fluid treatment system with the prior art approaches, a series of Computer Fluid Dynamics (CFD) models were created and evaluated.

The following is a general concordance of Examples and fluid treatment systems (the precise number and layout of radiation sources is not identical as described below):

| Example | Fluid Treatment System |
|---------|------------------------|
| A | FIG. 4/8 |
| B | FIG. 1 |
| C | FIG. 2 |
| D | Sidewalls with no deflectors or recesses |

Setup of CFD Model

For Examples A, B, C and D, use was made of a lamp pattern comprised of 2 columns and 6 rows with a lamp spacing of 5 inches in the y-direction and a spacing of 7.5 inch in x-direction. The diameter of the protective (transmittance) sleeve was 2 inch. The surface roughness of the UV lamp sleeves was zero. The fluid flow entered from the left side and exited at the right side of the computational domain. The simple CF reactor was formed in a narrow rectangular channel with long lamps transverse to fluid flow direction. The reactor was symmetrical in the lamp direction. Two dimensional computational domains for confined CF reactor were simulated in a conventional manner.

Turbulent Modeling

Turbulent flow was solved by using Continue and Navier Stokes equations. Turbulent flow was modeled in order to include the turbulent effects. A realizable k-ε model with a wall function was used in the simulations of turbulent flow by using Fluent 6.2.22 software to accurately predict the velocity field, pressure, turbulence and the fluid flow pattern for each case.

Boundary Conditions

Reference velocity at the fluid treatment zone were defined in such way that for each case, an applied ideal dose, defined as a maximum UV light energy received by the reactor in a perfect flow mixing condition, was maintained same as 24 $mJ/cm^2$ at UVT 65%. The inlet velocity was 0.57 m/s for all the studied cases.

A segregated solver with all second-order schemes was used in Fluent 6.2.22 simulation.

The residual criterion for all variables was $10^{-5}$.

An unstructured mesh was adapted. The total number of cells for each case is about 35,000. Meshes were generated using Gambit 2.2.30 (Fluent software). $Y^+$ for all the cases is less than 50. A special 4-boundary layer at $1^{st}$ distance of 0.01 inch from sleeve and with a growing rate of 1.2 was used.

The following is a summary of the parameters used in Examples A, B, C and D:

Low pressure lamp: 306 UVC Watts;
Lamp arc length: 2 meters;
Lamp outer protective sleeve diameter: 2-inch;
UVT: in waste water treatment: 65%;
Ideal dose 24 $mJ/cm^2$ at UVT 65%;
# of rows: 6;
# of column: 2;
Lamp spacing in y-direction: 5 inch; and
Deform spacing in x direction: 7.5 inch.

Disinfection Modeling

The flow patterns generated by CFD tool were coupled to the DO model via user defined Eulerian function coded to simulate the first order of kinetics MS2. The DO radiation model is an integral part of Fluent software used to simulate the radiation field by solving the radiative transfer function (RTF) for a finite number of discrete solid angles, which was associated with a vector direction fixed in the global Cartesian coordinate system. The DO model transforms the RTF into a transport equation for radiation intensity in the same spatial coordinate system. It solves as many transport equations as there are vector directions. The solution method is identical to that used for the fluid flow and energy equations. Essentially the software numerically computes a dose field either dependent or independent of microbial kinetics.

Figure 9:
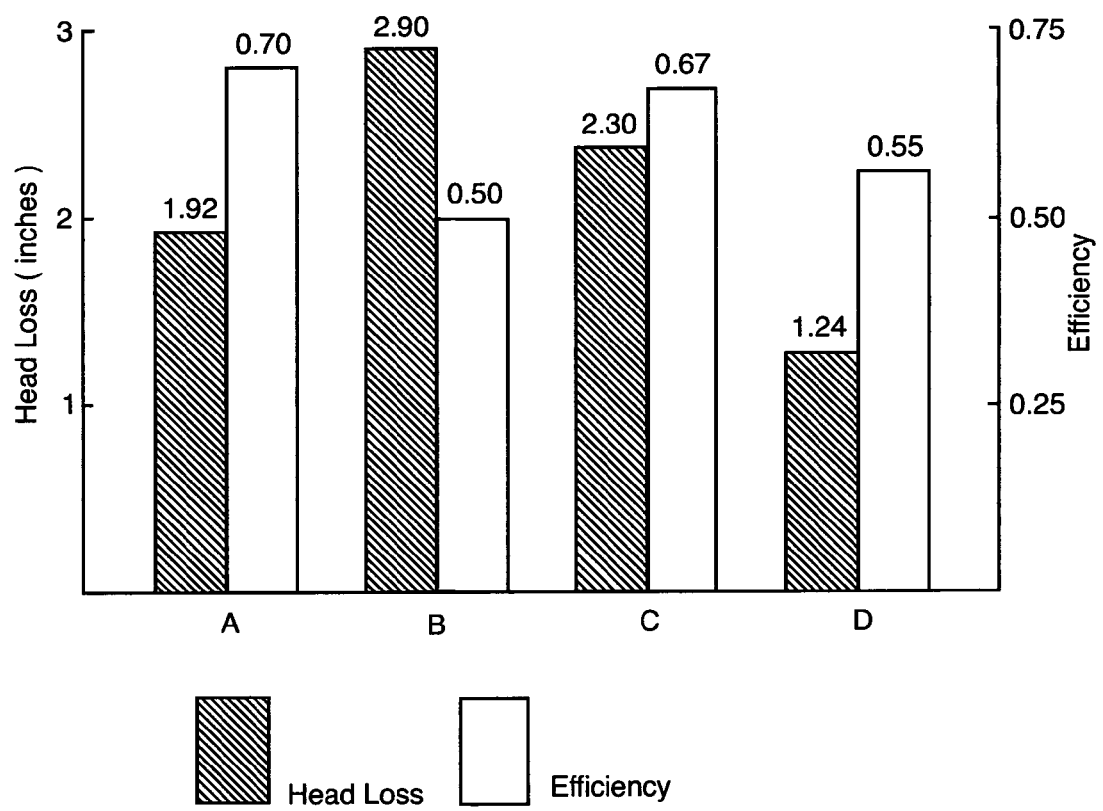
FIG. 9 is a graph illustrating the results of various testing on hydraulic head loss and disinfection efficiency of various fluid treatment systems.

With reference to FIG. 9, there is illustrated the depiction of a comparison between the hydraulic head loss and disinfection efficiencies for Examples A, B, C and D.

As will be apparent to those of skill in the art, Examples B and D are in accordance with prior art fluid treatment systems and thus are provided for comparison purposes only.

As shown, the fluid treatment system illustrated in FIG. 1 (Example B) has significantly high hydraulic head loss and low disinfection efficiency. In contrast, the fluid treatment systems illustrated in FIGS. 4/8 and 2/3 (Examples A and C, respectively) have improved hydraulic head loss and disinfection deficiency.

With respect to Example D, while this fluid treatment system has hydraulic head loss that was superior to the fluid treatment systems of Examples A and C, the latter systems had greater than 25% improved disinfection efficiency. Thus, using the fluid treatment systems in Examples A and C, it is possible to reduce the number of radiation sources by 25% to obtain the same fluid treatment as the fluid treatment system in Example D. This represents a significant improvement with respect to the fluid treatment systems of Examples A and C.

Figure 10:
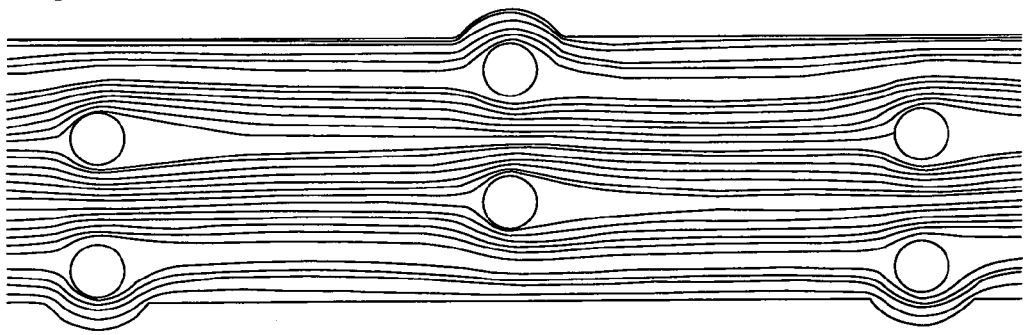
FIG. 10 illustrates the paths of fluid flow in the fluid treatment system of Example A (re.
Figure 11:
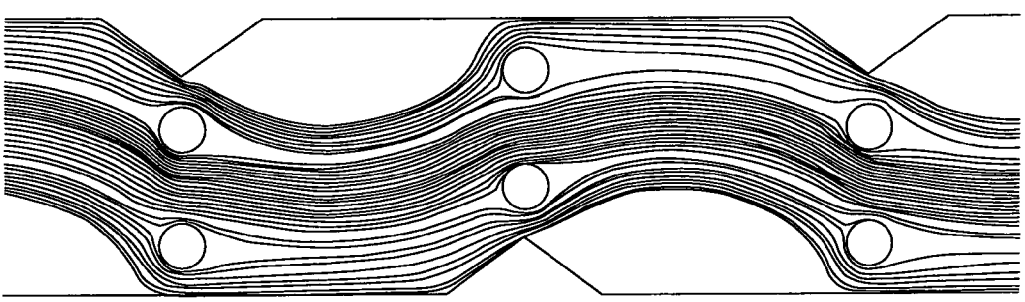
FIG. 11 illustrates the paths of fluid flow in the fluid treatment system of Example B (re.

FIG. 10 illustrates the paths of fluid flow in the fluid treatment system of Example A (re. FIG. 4) whereas FIG. 11 illustrates the paths of fluid flow in the fluid treatment system of Example B (re. FIG. 1—similar to Blatchley). As is apparent, the fluid treatment system illustrated in FIG. 10 uses a combination of the radiation source assembly and a prescribed wall structure to encourage fluid flow along the sides of the walls of the fluid treatment zone while obviating or mitigating short circuiting. This is done by distributing fluid flow through the fluid treatment zone in a substantially uniform manner. In contrast, the fluid treatment system illustrated in FIG. 11 serves to concentrate fluid flow toward the middle of the fluid treatment zone in a non-uniform manner.

Figure 12:
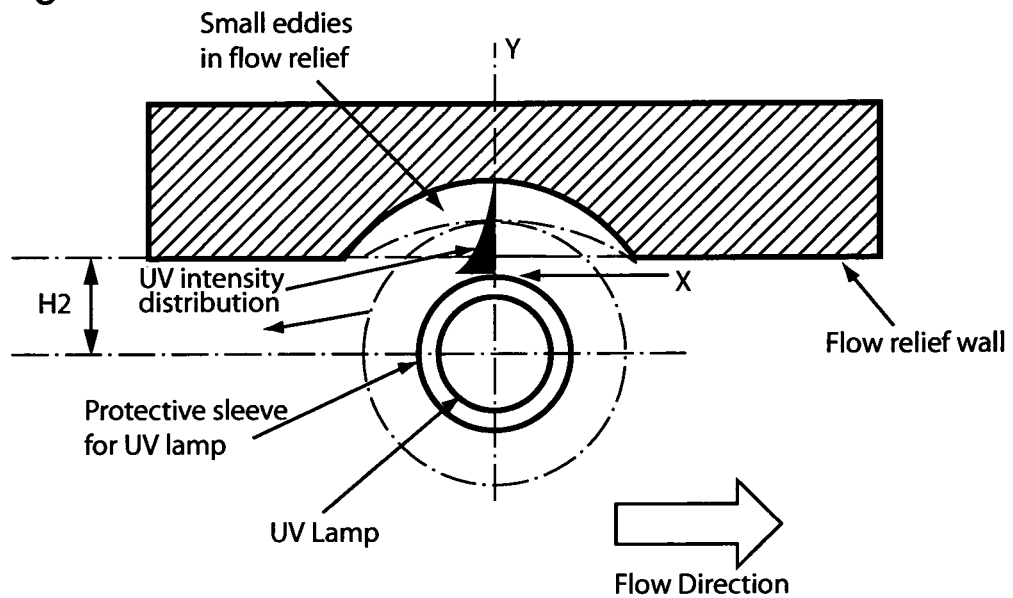
FIGS. 12-17 each illustrate fluid velocity profiles and/or radiation intensity distributions in various fluid treatment systems.
Figure 13:
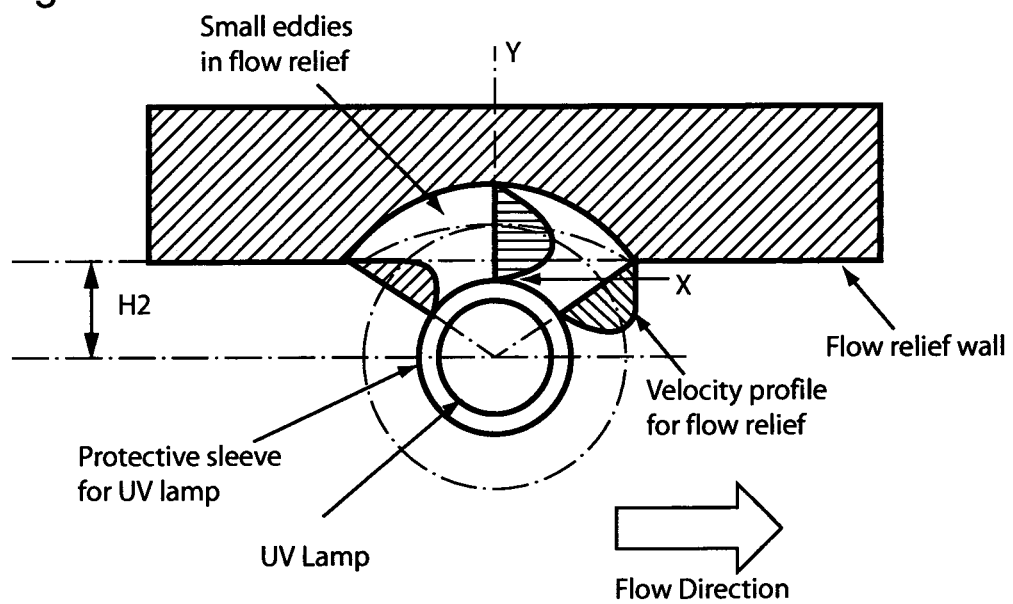
Figure 14:
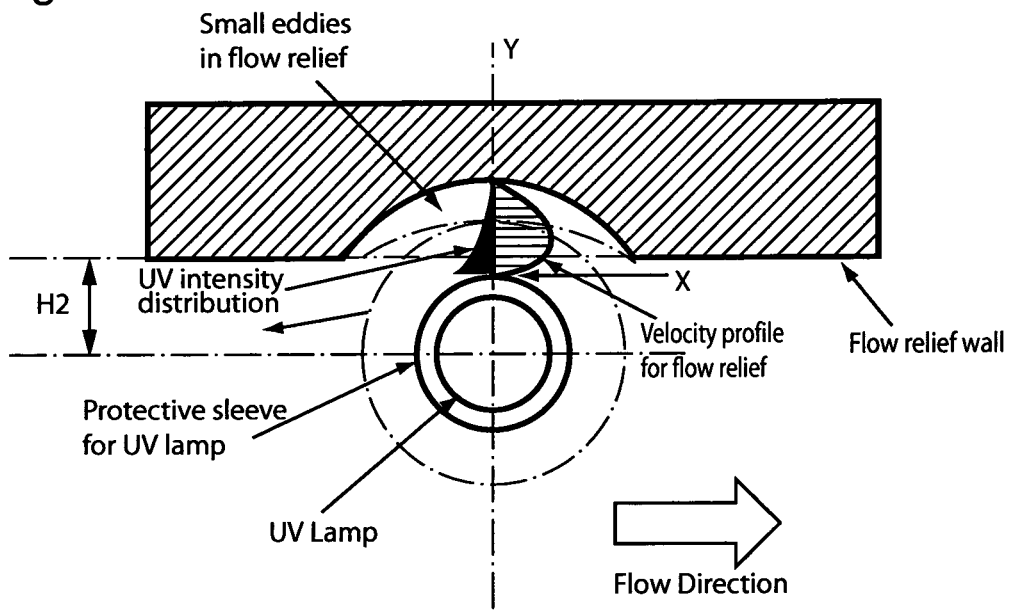

With reference to FIGS. 12-14, there is illustrated the UV intensity distribution and velocity profile for a fluid treatment system such as the one illustrated in FIGS. 4 and 8. It can be seen in FIG. 12 that UV intensity distribution based on the Beer's law is decayed from the outside of radiation surface. The highest intensity is located near the surface of sleeve and the intensity decreases as the distance from the surface of radiation source assembly is increased. CFD simulations show that flow separates at the sharp edge where it is connected with a straight wall and a half circle wall. This flow separation generates small vortices along the half circle wall to form turbulent shear layer which increases flow mixing in this path. The velocity profile is close to a parabolic shape but with its amplitude of velocity shifted closer to the lamp sleeve. Due to turbulent mixing, the kinetic energy of the flow that has a high momentum is diffused to the region where flow has a low momentum near the half circle wall. Flow velocity in this path is also relatively low, because the sectional area is suddenly changed from relatively small to relatively large. This combination of a long path around the lamp sleeve, well mixing and small eddies, and relatively slow-moving of flow increases the amount of radiation received by the fluid. Accordingly, this fluid treatment system is more efficient in this configuration/structure.

Figure 15:
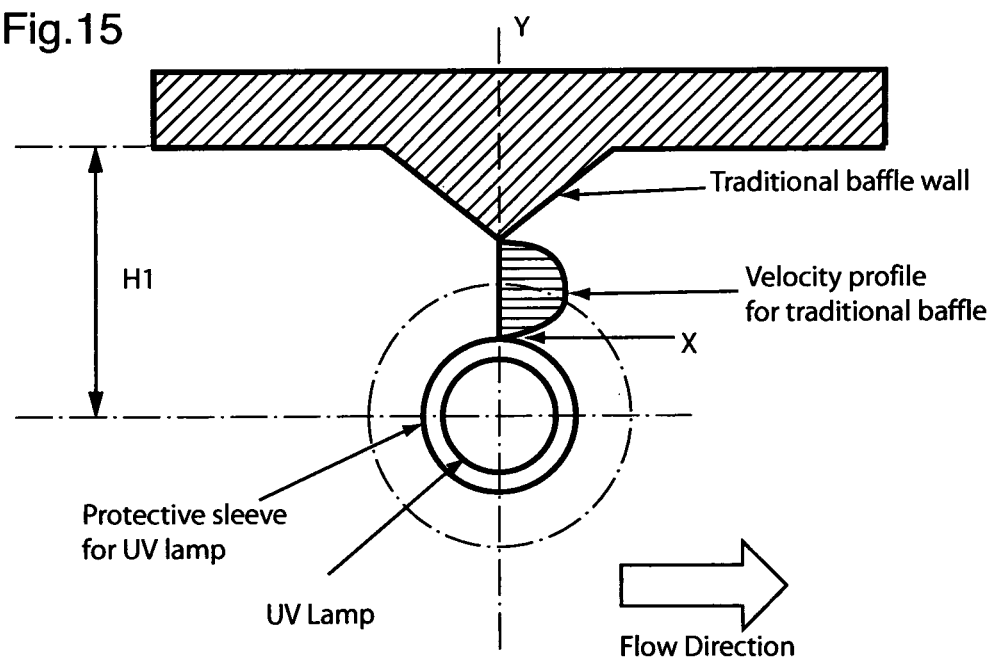
Figure 16:
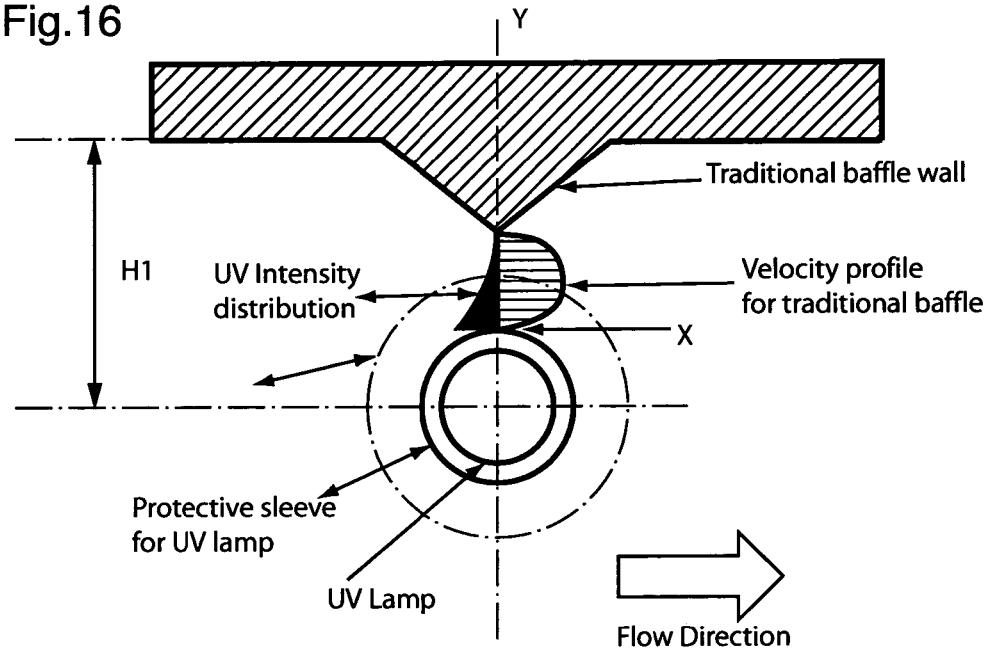

With reference to FIGS. 15 and 16, there is illustrated the UV intensity distribution and velocity profile for a fluid treatment system such as the one illustrated in FIG. 1—i.e., similar to the Blatchely approach. It can be seen that the position of triangle deflector and radiation source assembly forms a relatively contracted channel at the left side of the configuration which accelerates flow between the lamp sleeve and reactor wall. The resulting velocity profile is close to a parabolic shape having its large amplitude near the center. Flow velocity in between the sleeve and flow deflector is also higher compared with the illustrated flow relief of the present invention. This is due to the fact that the ratio of the contracted area at the left side of the configuration is much larger in the flow deflector than with the flow relief. The fluid is not guided or directed around the lamp sleeve as was the case for the fluid treatment system illustrated in FIGS. 12-14 above. With the conventional flow diverter, there is only a very short path of high velocity near the lamp sleeve and wall. This short path and high velocity result in a low dose of energy received by the fluid. This combination of poor mixing and a relatively high velocity having a short path length around the radiation source assembly reduces the amount of radiation received by the fluid, which results in lower efficiency compared to the fluid treatment system illustrate in FIGS. 12-14.

Figure 17:
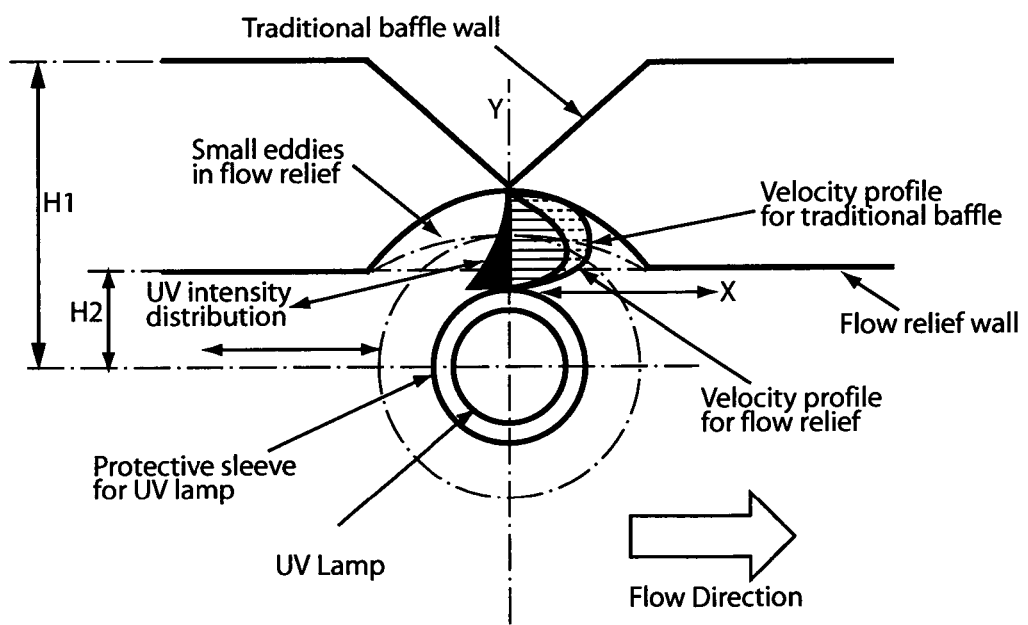

FIG. 17 illustrate a transposition of the key information provided in FIGS. 12-16.

One of the features of the present fluid treatment system is the provision of receptacle portions in alignment with a radiation source. This approach differs from that taught by Blatchley—i.e., the use of fluid deflectors projecting into the fluid treatment zone in alignment with a radiation source.

To illustrate the difference, reference will now be made to FIGS. 18-21.

Figure 18:
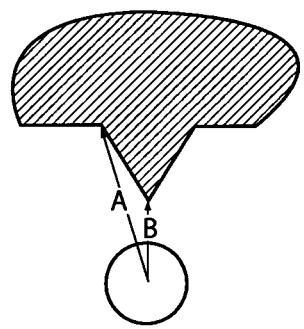
FIG. 18 illustrates an enlarged schematic view of a portion of a prior art fluid treatment system similar to the one disclosed in Blatchley.

With reference to FIG. 18, it can be seen that the arrangement shown is similar to that described by Blatchley. In this arrangement, it can be readily seen that there is a junction between the fluid diffuser and the wall of the reactor. The distance between the centerpoint of the radiation source and that junction is shown as A. The distance between the centerpoint of the radiation source and the apex of the fluid deflector is shown as B. As is clearly evident, the ratio of B:A is less then 1.

Figure 19:
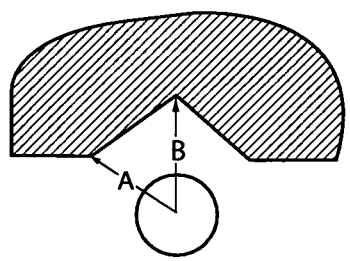
FIGS. 19-21 illustrate an enlarged schematic view of portion of preferred embodiments of the present fluid treatment system.
Figure 20:
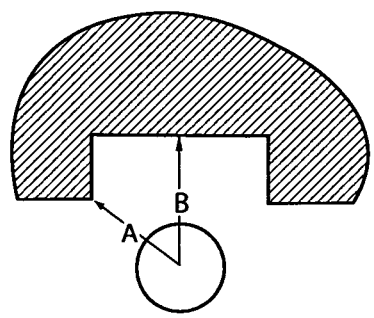
Figure 21:
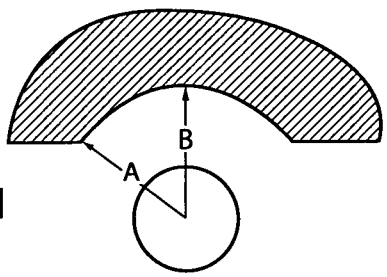

In contrast, with reference to FIGS. 19-21, (corresponding to the fluid treatment systems illustrated in FIGS. 7, 6 and 4, respectively) the ratio of B:A is equal to 1 (FIG. 21) or greater then 1 (FIGS. 19 and 20). Of course, it will be realised that B in FIGS. 19-21 represents the distance between the centerpoint of the radiation source an the apex of the receptacle portion.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:
1. A fluid treatment system comprising:
an inlet;
an outlet;
a fluid treatment zone disposed between the inlet and the outlet, the fluid treatment zone comprising a first wall surface and a second wall surface opposed to the first wall surface;

a first radiation source assembly comprising a radiation source having a first longitudinal axis extending substantially transverse to a direction of fluid flow through the fluid treatment zone;

a first fluid receptacle portion disposed in the first wall surface to define (a) a first junction between the first fluid receptacle portion and the first wall surface and (b) a second junction between the first fluid receptacle portion and the first wall surface, the first fluid receptacle portion comprising a first apex portion configured such that a first ratio of (i) a first distance between a first centerpoint of the first radiation source and the first apex portion, to (ii) a second distance between the first centerpoint and the first junction is greater than or equal to 1, the first fluid receptacle having a cross-section extending in a direction transverse to (i) the first longitudinal axis and (ii) a longitudinal axis of the first fluid receptacle portion, said cross section comprising a rectilinear shape, a distance C between (i) a line extending from the first junction to the second junction to (ii) a closest outermost surface of the first radiation source assembly, being greater than zero, wherein the radiation source assembly is on the side of line closer to the fluid treatment zone than to the receptacle.

2. The fluid treatment system defined in claim 1, wherein the first fluid receptacle portion comprises a square-shaped cross-section.

3. The fluid treatment system defined in claim 1, wherein the first fluid receptacle portion comprises a triangular-shaped cross-section.

4. The fluid treatment system defined in claim 1, wherein the first fluid receptacle portion comprises a bilaterally-symmetrical trapezoid-shaped cross-section.

5. The fluid treatment system defined in claim 1, wherein the first ratio is equal to 1.

6. The fluid treatment system defined in claim 1, wherein the first ratio is greater than 1.

7. The fluid treatment system defined in claim 1, wherein the first distance is measured along a first line orthogonal to the direction of fluid flow through the fluid treatment zone.

8. The fluid treatment system defined claim 1, wherein an edge of the first radiation source assembly is spaced with respect to the first wall surface to define a first gap therebetween.

9. The fluid treatment system defined in claim 1, further comprising a second radiation source assembly comprising a radiation source having a second longitudinal axis transverse to a direction of fluid flow through the fluid treatment zone, and a second fluid receptacle portion disposed in the second wall surface to define a third junction therebetween, the second fluid receptacle portion comprising a second apex portion configured such that a second ratio of (i) a third distance between a second centerpoint of the second radiation source and the second apex portion, to (ii) a fourth distance between the second centerpoint and the second junction is greater than or equal to 1.

10. The fluid treatment system defined in claim 9, wherein the second fluid receptacle portion comprises a curved cross-section.

11. The fluid treatment system defined in claim 9, wherein the second fluid receptacle portion comprises a partially circular cross-section.

12. The fluid treatment system defined in claim 9, wherein the second fluid receptacle portion comprises a semi-circular cross-section.

13. The fluid treatment system defined in claim 9, wherein the second fluid receptacle portion comprises a rectilinear cross-section.

14. The fluid treatment system defined in claim 9, wherein the second fluid receptacle portion comprises a square-shaped cross-section.

15. The fluid treatment system defined in claim 9, wherein the second fluid receptacle portion comprises a triangular-shaped cross-section.

16. The fluid treatment system defined in claim 9, wherein the second fluid receptacle portion comprises a bilaterally-symmetrical trapezoid-shaped cross-section.

17. The fluid treatment system defined in claim 9, wherein the second ratio is equal to 1.

18. The fluid treatment system defined in claim 13, wherein the second ratio is greater than 1.

19. The fluid treatment system defined in claim 9, wherein the second distance is measured along a second line orthogonal to the direction of fluid flow through the fluid treatment zone.

20. The fluid treatment system defined in claim 9, wherein an edge of the second radiation source assembly is spaced with respect to the second wall surface to define a second gap therebetween.

21. The fluid treatment system defined in claim 9, wherein the first fluid receptacle portion is positioned upstream of the second fluid receptacle portion.

22. The fluid treatment system defined in claim 9, wherein the first fluid receptacle portion is positioned downstream of the second fluid receptacle portion.

23. The fluid treatment system defined in claim 9, wherein one or both of the first fluid receptacle portion and the second fluid receptacle portion have a flat apex portion.

24. The fluid treatment system defined in claim 9, wherein each of the first fluid receptacle portion and the second fluid receptacle portion has a pointed apex portion.

25. The fluid treatment system defined in claim 9, wherein each of the first fluid receptacle portion and the second fluid receptacle portion has a cross-section in the shape of a triangle.

26. The fluid treatment system defined in claim 25, wherein the triangle is an isosceles triangle.

27. The fluid treatment system defined in claim 25, wherein the triangle is an equilateral triangle.

28. The fluid treatment system defined in claim 25, wherein the triangle is a scalene triangle.

29. The fluid treatment system defined in claim 25, wherein the triangle is a right-angled triangle having a right-angle surface forming a normal with the direction of fluid flow.

30. The fluid treatment system defined in claim 29, wherein the right-angle surface is positioned on an upstream portion of the fluid receptacle portion.

31. The fluid treatment system defined in claim 29, wherein the right-angle surface is positioned on an downstream portion of the fluid receptacle portion.

32. The fluid treatment system defined in claim 9, wherein a plurality of rows of radiation source assemblies is disposed in the fluid treatment zone to define an at least one array of radiation source assemblies, each row comprising a plurality of radiation source assemblies in spaced relation in a direction transverse to the direction of fluid flow through the fluid treatment zone to define a gap through which fluid may flow between an adjacent pair of radiation source assemblies; all rows in the array being staggered with respect to one another in a direction orthogonal to the direction of fluid flow through the fluid treatment zone such that the gap between an adjacent pair of radiation source assemblies in an upstream row of radiation source assemblies is partially or completely obstructed in the direction of fluid flow by at least two serially disposed downstream rows of radiation source assemblies.

33. The fluid treatment system defined in claim 32, wherein the array of radiation source assemblies comprises: a first row of radiation source assemblies, a second row of radiation source assemblies downstream from the first row of radiation source assemblies, a third row of radiation source assemblies downstream from the second row of radiation source assemblies and a fourth row of radiation source assemblies downstream from the third row of radiation source assemblies; an adjacent pair of radiation source assemblies in the first row defining a first gap through which fluid may flow, a radiation source assembly from the second row partially obstructing the first gap to divide the first gap into a second gap and a third gap, a radiation source assembly from the third row at least partially obstructing the second gap and a radiation source assembly from the fourth row at least partially obstructing the third gap.

34. The fluid treatment system defined in claim 33, wherein the fluid treatment system comprises a multiple number, N, of the array.

35. The fluid treatment system defined in claim 34, wherein N has a value of from 1 to 10.

36. The fluid treatment system defined in claim 32, wherein the fluid treatment zone is disposed in an open channel configured to receive a flow of fluid.

37. The fluid treatment system defined in claim 36, wherein the at least one array of radiation source assemblies is disposed substantially vertically in the open channel.

38. The fluid treatment system defined in claim 1, wherein the fluid treatment zone is disposed in an enclosure having a closed cross-section configured to receive a flow of fluid.

39. The fluid treatment system defined in claim 38, wherein the closed cross-section of the enclosure comprises a polygonal shape.

40. The fluid treatment system defined in claim 38, wherein the closed cross-section of the enclosure comprises a rectilinear shape.

41. The fluid treatment system defined in claim 38, wherein the closed cross-section of the enclosure comprises a square shape.

42. The fluid treatment system defined in claim 38, wherein the closed cross-section of the enclosure comprises a rectangular shape.

43. The fluid treatment system defined in claim 32, wherein each radiation source assembly comprises a radiation source.

44. The fluid treatment system defined in claim 43, wherein the radiation source is disposed in a protective sleeve.

45. The fluid treatment system defined in claim 4, wherein the protective sleeve comprises a closed end and an open end.

46. The fluid treatment system defined in claim 44, wherein the protective sleeve comprises a curved cross-section.

47. The fluid treatment system defined in claim 44, wherein the protective sleeve comprises a circular cross-section.

48. The fluid treatment system defined in claim 44, wherein the protective sleeve comprises an elliptical cross-section.

49. The fluid treatment system defined in claim 32, wherein each radiation source assembly comprises an ultraviolet radiation source.

50. The fluid treatment system defined in claim 32, wherein each radiation source assembly comprises a low pressure high output ultraviolet radiation source.

51. A fluid treatment system comprising:
an inlet;
an outlet;
a fluid treatment zone disposed between the inlet and the outlet, the fluid treatment zone comprising a first wall surface and a second wall surface opposed to the first wall surface;
a first radiation source assembly comprising a radiation source having a first longitudinal axis extending substantially transverse to a direction of fluid flow through the fluid treatment zone;
a first fluid receptacle portion disposed in the first wall surface to define (a) a first junction between the first fluid receptacle portion and the first wall surface and (b) a second junction between the first fluid receptacle portion and the first wall surface, the first fluid receptacle portion comprising a first apex portion configured such that a first ratio of (i) a first straight line distance between a first centerpoint of the first radiation source and the first apex portion, to (ii) a second straight line distance between the first centerpoint and the first junction is greater than or equal to 1, the first fluid receptacle portion comprising a trapezoidal cross-section when viewed from a direction transverse to a fluid flow through the fluid treatment zone, the first fluid receptacle portion having a longitudinal axis substantially parallel to the first longitudinal axis,
the first radiation source assembly being disposed adjacent the first receptacle portion in the first wall surface,
a second radiation source assembly being disposed adjacent a second receptacle portion that is disposed in the first wall surface downstream of the first receptacle,
at least third and fourth radiation source assemblies being disposed adjacent the first wall surface between the first and second radiation source assemblies.

52. A fluid treatment system comprising:
an inlet;
an outlet;
a fluid treatment zone disposed between the inlet and the outlet, the fluid treatment zone comprising a first wall surface and a second wall surface opposed to the first wall surface;
a first radiation source assembly comprising a radiation source having a first longitudinal axis extending substantially transverse to a direction of fluid flow through the fluid treatment zone;
a first fluid receptacle portion disposed in the first wall surface to define (a) a first junction between the first fluid receptacle portion and the first wall surface and (b) a second junction between the first fluid receptacle portion and the first wall surface, the first fluid receptacle portion comprising a first apex portion configured such that a first ratio of (i) a first straight line distance between a first centerpoint of the first radiation source and the first apex portion, to (ii) a second straight line distance between the first centerpoint and the first junction is greater than or equal to 1, the distance between the first junction and the second junction being greater than a diameter of the radiation source assembly, the first fluid receptacle portion comprising one of (i) a trapezoidal, (ii) a rectangular, (iii) a square, and (iv) a triangular, cross-section when viewed from a direction transverse to fluid flow through the fluid treatment zone, the first fluid receptacle portion having a longitudinal axis substantially parallel to the first longitudinal axis,
a distance C between (i) a line extending from the first junction to the second junction to (ii) a closest outermost surface of the first radiation source assembly, being greater than zero wherein the radiation source assembly is on the side of line closer to the fluid treatment zone than to the receptacle, the first radiation source assembly being disposed adjacent the first receptacle portion in the first wall surface, a second radiation source assembly being disposed adjacent a second receptacle portion that is disposed in the first wall surface downstream of the first receptacle, at least third and fourth radiation source assemblies being disposed adjacent the first wall surface between the first and second radiation source assemblies.

\* \* \* \* \*